United States Patent [19]

Randolph

[11] Patent Number: 5,488,752
[45] Date of Patent: Feb. 6, 1996

[54] HEAT CONDUCTING APPARATUS FOR WIPER BLADES

[76] Inventor: Norman C. Randolph, 4331 Porter Ave., Ogden, Utah 84403

[21] Appl. No.: 172,490

[22] Filed: Dec. 23, 1993

[51] Int. Cl.$^6$ ........................................................ B60S 1/38
[52] U.S. Cl. ........................ 15/250.06; 15/250.48; 15/250.41; 219/202
[58] Field of Search ............................. 15/250.05, 250.06, 15/250.07, 250.08, 250.09, 250.36, 250.41, 250.42; 219/202, 203, 544, 546, 548, 542, 543, 457, 545

[56] References Cited

U.S. PATENT DOCUMENTS

| | | | |
|---|---|---|---|
| 1,724,530 | 8/1929 | Storms | 15/250.09 |
| 1,947,803 | 2/1934 | Sandman | 15/250.07 |
| 2,677,143 | 5/1954 | Blaney | 15/250.06 |
| 2,865,040 | 12/1958 | Hamm | 15/250.06 |
| 3,936,901 | 2/1976 | Theckston | 15/250.06 |
| 4,192,038 | 3/1980 | Klein et al. | 15/250.06 |
| 4,325,160 | 4/1982 | Burgess | 15/250.06 |
| 4,360,941 | 11/1982 | Mabie | 15/250.06 |
| 4,439,666 | 3/1984 | Graham | 219/545 |
| 4,700,425 | 10/1987 | Rosnak | 15/250.41 |
| 4,928,344 | 5/1990 | Bliss | 15/250.06 |
| 4,928,345 | 5/1990 | Meltzer et al. | 15/250.06 |
| 5,221,828 | 6/1993 | Basheer et al. | 219/202 |

FOREIGN PATENT DOCUMENTS

| | | | |
|---|---|---|---|
| 1282710 | 12/1961 | France | 15/250.09 |
| 527321 | 9/1976 | U.S.S.R. | 15/250.09 |
| 413551 | 7/1934 | United Kingdom | 15/250.09 |

*Primary Examiner*—Gary K. Graham
*Attorney, Agent, or Firm*—Berne S. Broadbent; Gary D. E. Pierce

[57] ABSTRACT

A heat conducting apparatus for wiper blades including a wiper arm assembly and a wiper blade which can be removably attached to the wiper arm assembly by means of a mounting member operably interacting with a plurality of blade retaining members. Integrally formed within the body of the wiper blade is an internal conduit substantially extending the linear length of the wiper blade from a first end to a second end thereof. Housed within the internal periphery of the internal conduit and extending therethrough is an electrical resistant heating element. Preferably, the heating element is rotatably wound in a plurality of cylindrical coils to provide sufficient electrical resistance without requiring heavy insulation or resistors to monitor the heat output temperature of the heating element. Suspended within a uniform "heating space" formed within the internal conduit, the heating element is connected at both ends of the internal conduit of the wiper blade to an electrical connecting means which can provide and electrical current to the heating element to generate a heat output. When the heating conducting apparatus of the present invention is activated, the heating element provides a continuous heat output temperature of between approximately 26° C. and 38° C., to maintain the flexibility of the wiper blade and to remove and/or prevent snow and/or ice from accumulating thereon.

19 Claims, 1 Drawing Sheet

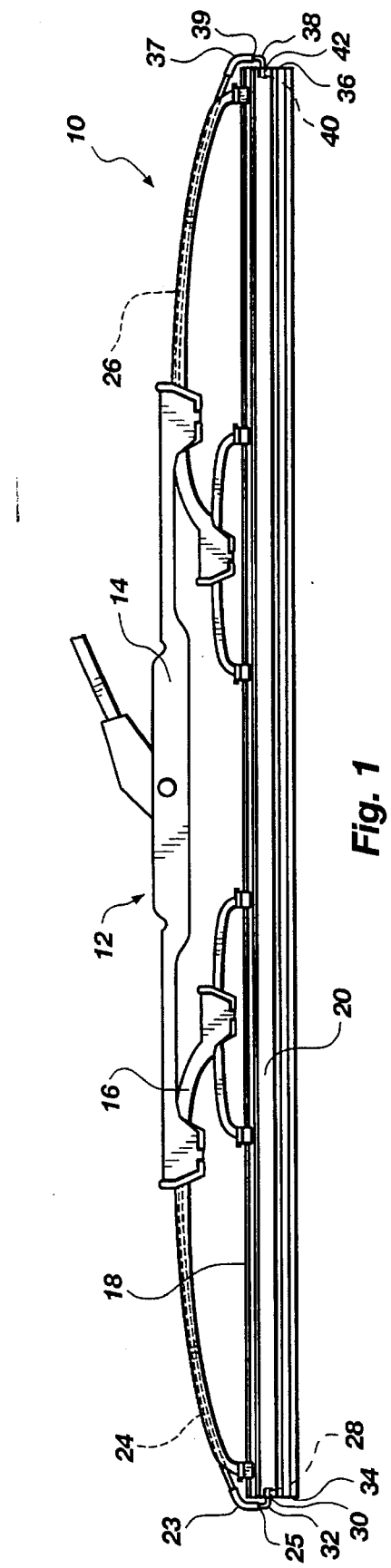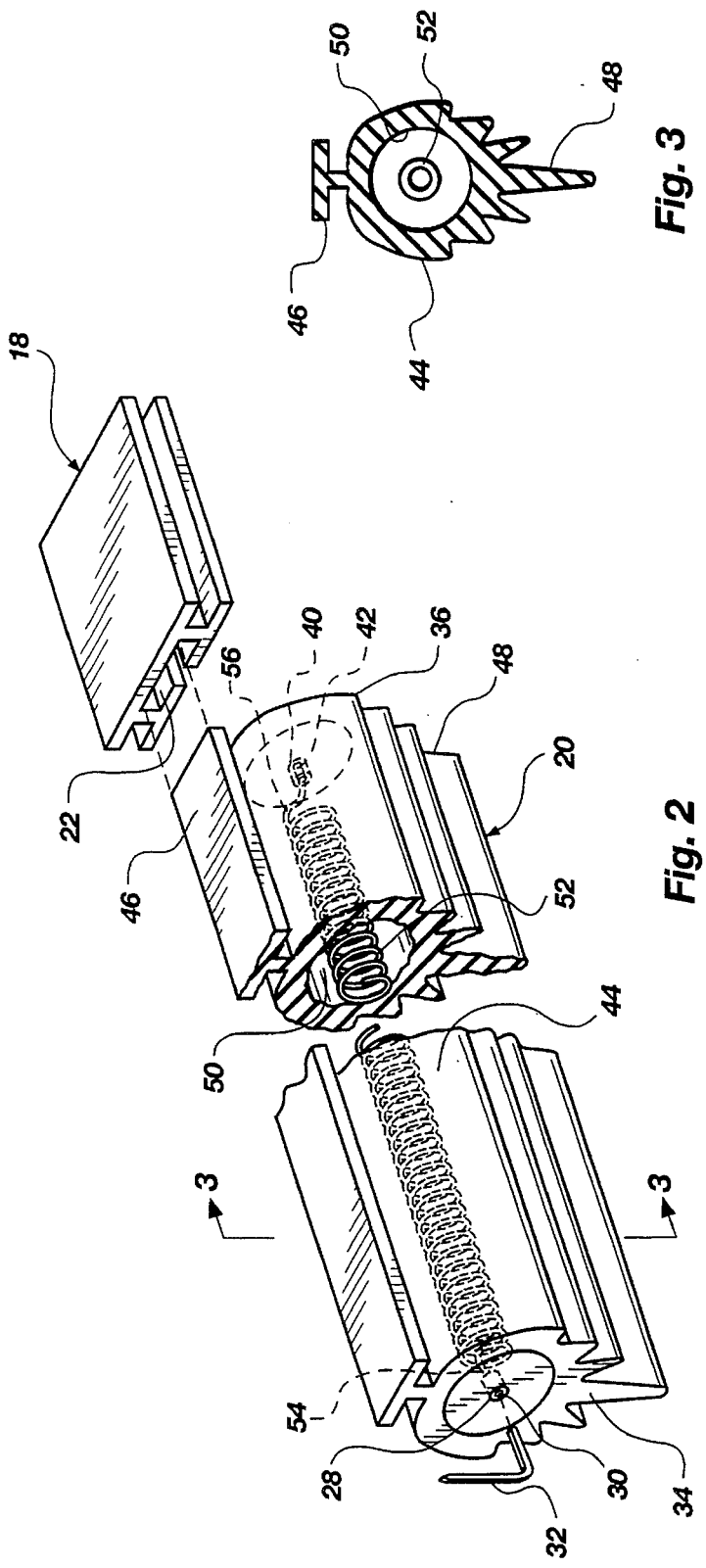

HEAT CONDUCTING APPARATUS FOR WIPER BLADES

BACKGROUND

1. The Field of the Invention

The field of this invention relates to windshield wiper assemblies and, more particularly, to novel heat conducting apparatus for wiper blades.

2. The Background Art

Wiper arm assemblies, in general, are responsible for clearing and removing precipitation, dirt and other forms of debris which accumulate on the exterior surface of windshields and rear windows of motor vehicles. Typically, wiper arm assemblies operate by reciprocating at least one wiper blade back and forth across the windshield to provide a clean and clear visual field for the driver and occupants of the vehicle. During ambient freezing conditions, however, significant complications may arise having adverse effects on the functionality of wiper arm assemblies.

For example, in cold inclement weather, precipitation in the form of snow and ice may accumulate on the surface of a windshield and impair general visibility therethrough. As snow and ice begins to collect on wiper arm assemblies, wiper blades typically begin to harden, thus losing their flexibility. Consequently, this loss of flexibility in a wiper blade generally results in a notable interference in the efficiency of the clearing action of the blade.

Solid formations of ice may develop between wiper blades and the surface of the windshield causing the wiper blade to freeze to the windshield, thereby restricting subsequent reciprocating movement of the wiper blades across the surface of the windshield for clearing a visual field for the driver and occupants of the vehicle. Similarly, wiper blades may become so encrusted with snow and ice that solid formations of ice develop on the leading edges of the wiper blades causing the blades to become physically lifted and removed from direct contact with the surface of the glass. When this happens, the ability of the wiper blade to effectively track the contour of the windshield is seriously frustrated. In addition, under these circumstances, as the wiper arm assembly passes the wiper blade back and forth across the windshield, the ice formed on the leading edge of the blade typically produces streaks and smears of slush or water across the surface of the windshield resulting in subsequent visual obstructions to the driver and occupants of the vehicle.

In an effort to soften and melt accumulations of snow and ice on a windshield, window defrosters were developed by those skilled in the art. Traditionally, prior art defrosters were developed to generate circulating currents of warm air which are directed against the interior surface of the windshield or window. The amount of heat generated by prior art defrosters, however, is generally insufficient to melt solid formations of ice or snow which have accumulated on wiper blades or wiper arm assemblies. Moreover, window defrosters of the prior art are typically unable to transfer sufficient heat to soften the stiffness of a wiper blade which has lost its flexibility and initially hardened due to ambient freezing conditions. In some instances, prior art windshield defrosters begin to thaw accumulations of snow and ice formed on upper surfaces of the windshield, thereby creating a watery slush which typically runs down the surface of the windshield and begins to freeze on the wiping edge of the wiper blade, thereby constructively immobilizing the effectiveness of the clearing action of the wiper blade.

In an attempt to overcome these disadvantages, those skilled in the art developed various wiper blade heating assemblies which provide heat directly to the body of the wiper blade in an effort to remove and further prevent accumulations of snow and/or ice forming thereon. These attempts, however, have generally proven to be very costly and substantially ineffective.

For example, prior art wiper blade heating assemblies were developed by those skilled in the art utilizing extremely expensive resistive materials, such as, Nichrome and tungsten, as heat conductive elements. The excessive cost of Nichrome and tungsten when used as heating elements may be considered nominal when their uses are essential to sustain high heat outputs typically in excess of 523° C. (1000° F.). However, when considerably less heat is required to melt snow and/or ice accumulations from windshields, wiper blades or wiper blade assemblies, the cost of Nichrome or tungsten is generally considered prohibitive from a manufacturing viewpoint. Pursuant thereto, the cost of utilizing Nichrome or tungsten as heating elements in prior art wiper blade heating assemblies typically raises the market price of the heating assembly to a point that it may become an unaffordable solution for the consumer. As will be appreciated in this art, economic considerations of this nature are significant when dealing with the highly competitive automobile industry, since relatively complicated devices are frequently found to be commercially impractical. Accordingly, even a slight savings in cost may substantially enhance the commercial appeal of a particular component or assembly when considering issues of mass production of the product.

A major disadvantage with wiper blade heating assemblies of the prior art is their use of heating elements which typically require a protective coating of insulation to shield the elastomeric, rubber-like characteristics of the wiper blade from the direct heat output generated by the heating element. Types of protective insulations typically used to encase prior art heating elements, include for example, ceramic, teflon, nylon polymer coatings, etc., all of which generally interfere with the overall flexibility of the wiper blade. As a result, prior art wiper blades having heating elements embedded therein or in connection therewith, typically forfeit a significant portion of their resiliency as a result of the non-flexible characteristics of the insulated coatings surrounding the heating elements. Moreover, in this regard, prior art heating elements generally restrict the ability of the blade to track the contour of the windshield with precision.

In an effort to address the disadvantages associated with the lack of flexibility in wiper blades of prior art wiper blade heating assemblies, those skilled in the art developed a method for vulcanizing wiper blades comprising a mixture of carbon black and graphite to form a conductive wiper blade. This prior art process for vulcanizing rubber, however, requires high concentrations of carbon black to induce sufficient conductivity in the wiper blade having a negative effect on decreasing the flexibility of the blade and increasing the hardness of the rubber so that the wiper blade is no longer suitable for tracking the contour of the windshield.

Another significant disadvantage of prior art wiper blade heating assemblies as described above involves the problems associated with premature aging of the wiper blade caused by thermal abrasions and fatigue to the body of the blade as a result of localized high heat output temperatures against the wiper blade in direct contact with the heating element. This form of direct heat contact with a high heat output generated by prior art heating elements, typically results in the loss of elasticity in the rubber material comprising the wiper blade. In this regard, the heat output of prior art heating elements generally promotes degradation in the elastomeric characteristics of the rubber of the wiper blade, thus facilitating a shorter life span for the blade.

To counter these disadvantages associated with premature aging and thermal fatigue of wiper blades of prior art heating assemblies, those skilled in the art introduced various types of lubricants and parting agents to minimize the frictional and heat-induced effects caused by direct contact between the heating element and the wiper blade. Maintenance of lubricants or parting agents, however, generally presents multiple problems because of the difficulty in ascertaining whether the lubricant has been evaporated, or not, by the heat output of the prior art heating elements.

In addition, wiper blade heating assemblies of the prior art typically require complex assembly configurations which are neither easily replaceable or adaptable to conventional wiper blades or wiper assembly arms. For example, prior art weather protective hoods were developed by those skilled in the art which are made of a thin, rubber-like material which encloses and seals a pressure distributing wiper frame.

While the prior art wiper blade heating assemblies disclosed above may appear generally suitable for their intended purposes, these prior art heating assemblies nevertheless leave much to be desired from the standpoint of manufacturing costs, simplicity of construction and effectiveness of operation.

BRIEF SUMMARY AND OBJECTS OF THE INVENTION

In view of the foregoing, it is a primary object of the present invention to provide a heat conducting apparatus for wiper blades which utilizes a commercially inexpensive heating element which extends the linear length of the wiper blade in a tightly coiled formation to provide electrical resistance to the heating element without requiring heavy insulation around the heating element to buffer the heat output generated into the body of the wiper blade.

It is also an object of the present invention to provide a heat conducting apparatus for wiper blades which is capable of enhancing the flexibility and life span of the wiper blade, while eliminating thermal abrasions and fatigue in the wiper blade caused by localized high heat outputs generated by the heating element.

Further, it is an object of the present invention to provide a heat conducting apparatus for wiper blades which is capable of maintaining a continuous temperature of between 26° and 38° C. (80°–100° F.) to effectively remove and prevent snow and ice accumulations on wiper blades.

It is a still further object of the present invention to provide a heat conducting apparatus for wiper blades which is easily replaceable and adaptable to conventional wiper blades and wiper assembly arms.

Consistent with the foregoing objects, and in accordance with the invention as embodied and broadly described herein, a heat conducting apparatus for wiper blades is disclosed in one embodiment of the present invention as including a conventional wiper arm assembly and wiper blade which is removably attached to the wiper arm assembly by means of a mounting member operably interacting with a plurality of blade retaining members. Integrally formed within the body of the wiper blade is an internal cavity or conduit substantially extending the linear length of the wiper blade from a first end to a second end thereof. Introduced within the inner periphery of the internal conduit and extending therethrough is an electrical resistant heating element. Preferably, the heating element comprises a 30–32 gauge copper wire rotatably wound into a plurality of cylindrical coils which provide sufficient electrical resistance to the heat element without requiring heavy insulation or resistors to monitor the heat output temperature of the heating element. Suspended within a "heating space" formed within the internal conduit, the heating element is connected at both ends of the internal conduit of the wiper blade to an electrical connecting means providing current to the heating element to generate heat output. When the heating conducting apparatus of the present invention is activated, the heating element provides a continuous heat output temperature of between 26° to 38° C. (80°–100° F.), to maintain the flexibility of the wiper blade and to remove and prevent snow and/or ice accumulations forming thereon.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 1 is a perspective view of a heat conducting apparatus for wiper blades in accordance with one presently preferred embodiment of the present invention;

FIG. 2 is a perspective view of one presently preferred embodiment of the wiper blade and mounting bracket; and FIG. 3 is a cross-sectional view of the embodiment of FIG. 2 taken along lines 3—3 of FIG. 2, illustrating one presently preferred embodiment of the internal conduit formed within the body of the wiper blade, wherein the heating element is suspended.

DETAILED DESCRIPTION OF THE PREFERRED EMBODIMENT

It will be readily understood that the components of the present invention, as generally described and illustrated in the Figures herein, could be arranged and designed in a wide variety of different configurations. Thus, the following more detailed description of the embodiments of the apparatus and method of the present invention, as represented in FIGS. 1 through 3, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

One presently preferred embodiment of the heat conducting apparatus for wiper blades of the present invention, designated generally at 10, is illustrated in FIG. 1. As shown, heat conducting apparatus 10 comprises a wiper arm assembly 12 and a wiper blade 20. Wiper blade 20 is removably held by wiper arm assembly 12 by means of a mounting member 18 operably interacting with a plurality of blade retaining members 16.

As illustrated in FIG. 1, one presently preferred embodiment of wiper arm assembly 12 of the present invention is approximately 50 cm (20 in.) in length and formed in a substantially curvilinear configuration conforming to the contour of a windshield. Preferably, wiper arm assembly 12 is formed of non-corrosive stainless steel. It will be readily appreciated, however, that wiper arm assembly 12 can, of course, be provided in various lengths and formed of a wide variety of other suitable materials, such as, for example, plastic, fiberglass, metal or other suitable composite materials.

Wiper arm assembly 12 is formed having an elongated body member 14 and a plurality of blade retaining members 16 pivotally connected at each end of body member 14 and extending substantially outward therefrom. Blade retaining members 16 are mechanically adapted to receive and operably retain blade mounting member 18 to wiper arm assembly 12. Since the general structure of wiper arm assembly 12 is substantially the same as that of other conventional windshield wiper assemblies and is believed to be well known in the art to which this invention pertains, the specific structure and configuration of wiper arm assembly 12 will not, therefore, be described in further detail herein.

Electrically connected to wiper arm assembly 12 in a manner well known in the art is a wiper motor (not shown). The wiper motor facilitates the reciprocating movements of wiper arm assembly 12 and passes wiper blade 20 transversely across the windshield in a conventional manner.

Referring now to FIG. 2, wiper blade 20 is preferably formed of an elastomeric rubber or rubber-like material having good resilient characteristics, such as, for example, natural rubber, polyisoprene rubber, styrene butadiene rubber (SBR), or EPDM rubber. The foregoing examples of elastomeric materials, however, are merely descriptive of various preferred embodiments of wiper blade 20 of the present invention, and are not intended to be inherently restrictive thereby.

Wiper blade 20 is provided having a linear length approximating the curvilinear length of wiper arm assembly 12. Accordingly, the preferred embodiment of wiper blade 20 of the present invention is formed having a corresponding length of approximately 50 cm (20 in.), a height of approximately 1.2 cm (½ in.) and a width of approximately 0.6 cm (¼ in.). Since wiper blade 20 of the present invention must conform to the length of wiper arm assembly 12 to which it is applied, it is anticipated that different lengths of wiper blade 20 be formed to accommodate various lengths of wiper arm assemblies 12.

Wiper blade 20 comprises a main body 44, a mounting segment 46 and a wiping edge 48. Mounting segment 46 of wiper blade 20 is formed along the upper region of main body 44 and extends longitudinally from a first end 34 to a second end 36 of wiper blade 20. Mounting segment 46 is preferably configured having a substantially T-shaped body to provide an engaging means for operably inserting mounting segment 46 of wiper blade 20 into a longitudinally-oriented channel 22 formed in mounting member 18. Introduced within channel 22 of mounting member 18, mounting segment 46 of wiper blade 20 is removably held by wiper arm assembly 12 by means of blade retaining members 16 in cooperation therebetween, as generally illustrated in FIG. 1.

Projecting outwardly from the lower region of main body 44 is wiper edge 48 extending longitudinally from first end 34 to second end 36 of wiper blade 20. Preferably tapered in cross-section, wiping edge 48 projects substantially downward approximately 4 cm (³⁄₁₆ in.) in length for engagement with the surface of the windshield. It will be appreciated, however, that other projection lengths of wiping edge 48 of wiper blade 20 are possible.

Integrally formed within main body 44 of wiper blade 20 is a hollow internal cavity or conduit 50 having a substantially circular configuration, as depicted in cross-section in FIG. 3. Internal conduit 50 extends the linear length of wiper blade 20 from first end 34 to second end 36 and provides additional flexibility to wiper blade 20. In addition, internal conduit 50 provides a "heating space" having an internal diameter of approximately 0.2 cm (⁵⁄₃₂ in.) wherein a heating element 52 is introduced. Those skilled in the art will readily recognize that other possible configurations, measurements, modifications and/or adaptations which are consistent with the spirit and scope of the present invention are possible.

As illustrated in FIGS. 2 and 3, disposed within the periphery of internal conduit 50 is heating element 52. Preferably, heating element 52 consists of a 30–32 gauge copper wire rotatably wound into a plurality of tightly formed cylindrical coils. Heating element 52 can, of course, be formed of a wide variety of other suitable materials, including for example, various copper or metal alloys. In a coiled formation, the longitudinal dimension of heating element 52 is complimentary to the approximate linear length of wiper blade 20. Accordingly, since the presently preferred embodiment of wiper blade 20 of the present invention is approximately 50 cm (20 in.) in length, heating element 52 is substantially the same length in cylindrical coils. It will be readily appreciated, however, that other shapes or configurations of heating element 52 are possible.

Cylindrical coils are formed within the linear length of heating element 52 to provide sufficient electrical resistance to heating element 52, without requiring heavy insulation or electrical resistors to monitor the heat output. In this regard, the plurality of coils formed in heating element 52 have an inside diameter of approximately 0.15 cm (¹⁄₁₆ in.) and facilitate an electrical resistance of 6.5+/−1 ohms at 1 amp +/−0.5 amp at 12 volts input to generate a constant heat output temperature between approximately 26° and 38° C. (80°–100° F.) within internal conduit 50 of wiper blade 20. Although heating element 52 is preferably coated with an enamel or varnish based insulation to provide resistance to corrosion, oxidation and contamination, the form of protective coating insulating heating element 52 does not interfere with the heat output and flexibility of heating element 52 or the resiliency of wiper blade 20.

A first end 54 of heating element 52 is introduced through an opening of internal conduit 50 at second end 36 of wiper blade 20 and passed therethrough to first end 34 of wiper blade 20. First end 54 of heating element is operably connected to a female electrical connector plug 28 removably inserted within the recess of an opening of internal conduit 50 formed at first end 34 of wiper blade 20 and secured therein by means of an adhesive solvent. Other forms or means of fasteners, however, are readily possible. Female connector plug 28 is substantially circular and comprises a small through-bore 30 wherein a connector pin 32, as best shown in FIG. 2, is introduced to provide a closed electric current between heating element 52 and an insulated lead wire 24.

In order to suspend heating element 52 within the inner periphery of internal conduit 50, a second opposing end 56 of heating element 52 is operably connected to a female electrical connector plug 40. Female connector plug 40 is removably inserted within the recess of an opening of internal conduit 50 formed at second end 36 of wiper blade 20 and secured therein by means of an adhesive solvent. As stated above, other forms or means of fasteners, however, are readily possible. Female connector plug 40 comprises a small through-bore 42 wherein a connector pin 38, preferably L-shaped, is introduced to provide a closed electric current between heating element 52 and an insulated ground wire 26, as shown in FIG. 1.

The introduction of female connector plugs 28, 40 at both ends of internal conduit 50 of wiper blade 20 provides a substantially airtight "heating space" which restricts the escape of heat generated by heating element 52. In addition thereto, the suspension of heating element 52 within internal conduit 50 avoids any direct or continuous contact between heating element 52 and wiper blade 20. In this manner, wiper blade 20 does not suffer the disadvantages of premature aging or loss of flexibility due to thermal abrasions or fatigue typically generated by direct contact between heating element 52 and wiper blade 20. Moreover, the "heating space" of internal conduit 50 insures continuous flexibility and resiliency to main body portion 44 and wiping edge 48 of wiper blade 20.

Referring again to FIG. 1, an electrical connection is provided between a power source (battery) and heating element 52 by means of insulated lead wire 24 which facilitates the flow of electricity therebetween. While the first end of insulated lead wire 24 is operably connected to the power source, the leading end of insulated lead wire 24 is advanced to the location of wiper arm assembly 12 and further introduced along main body portion 14 and blade retaining member 16 of wiper arm assembly 12. Preferably, lead wire 24 is positioned within the inner contours of main body 14 and blade retaining member 16 to become substantially hidden from direct view. In one preferred embodiment of wiper arm assembly 12 of the present invention, insulated lead wire 24 is removably secured to underside portions of wiper arm assembly 12 by means of shrink wrap tubing to fasten lead wire 24 thereto. It will readily appreciated, however, that other means of fastening insulated lead wire 24 to wiper arm assembly 12, such as adhesives, are possible.

Operably attached to the leading end of insulated lead wire 24 is a male connector plug 23. Male connector plug 23 comprises a through-bore 25 formed therein. Introduced into through-bore 25 is a first extension of connector pin 32. Preferably, connector pin 32 is formed of copper or a copper alloy and configured in a substantially L-shape having at least two extending arms. It will be readily appreciated, however, that connector pin 32 may be formed of a variety of other suitable electrical conductive materials. As disclosed above, a second extension of connector pin 32 is introduced into through-bore 30 of female connector plug 28 to provide a closed electrical connection between the power source and heating element 52.

Preferably, a grounding connection is provided between the frame or firewall of the vehicle and heating element 52 by means of an insulated ground wire 26 extending therebetween. While the first end of insulated ground wire 26 is operably connected to a sufficiently grounded source, the leading end of lead wire 24 is threaded along the inner contours of wiper arm assembly 12 in substantially the same manner as insulated lead wire 24, which is disclosed above.

Operably attached to the leading end of insulated ground wire 26 is a second male connector plug 37. Male connector plug 37 comprises a through-bore 39 formed therein. Introduced into through-bore 39 is a first extension of connector pin 38. Preferably, connector pin 38 is formed of copper or a copper alloy and configured in a substantially L-shape having at least two extending arms. It will be readily appreciated, however, that connector pin 38 may be formed of a variety of other suitable electrical conductive materials. As disclosed above, a second extension of connector pin 38 is introduced into through-bore 42 of female connector plug 40 to provide a grounding connection between the firewall and heating element 52.

An alternative embodiment of the electrical connection between the power source, heating element 52 and ground of the present invention may comprise a female coupling means being removably secured within one end of internal conduit 50 having a first through-bore and second through-bore integrally formed therein. Preferably, the leading end of insulated lead wire 24 provides an electrical connection with the first through-bore of the female connector plug by means of a first connector pin. In addition, the leading end of insulated ground wire 26 provides an electrical connected with the second through-bore of the female connector plug by means of a second connector pin. In this manner, the alternative embodiment of female connector plug provides means for receiving the electric current from the power source through the first through-bore and for grounding the current flowing through heating element 52 through an adjacent second through-bore.

Preferably, a conventional switching mechanism (not shown) is provided for activating and controlling the flow of electricity from the power source to heating element 52 of heat conducting apparatus 10. The switching mechanism is preferably positioned within the interior of the vehicle near the dashboard for convenience to the driver for activating heat conducting apparatus 10. Preferably, electrical wiring is provided for interfacing the switching mechanism with the ignition system of the vehicle to provide means for disengaging heat conducting apparatus 10 when the ignition is turned off. The switching mechanism may comprises a manual rocker type switch with or without an external indicator light or an automatic switch having sensor capabilities. It will be readily appreciated, however, that other types of switching mechanisms may be used in conjunction with heat conducting apparatus for wiper blades 10 of the present invention.

Another advantage to heat conducting apparatus for wiper blades 10 of the present invention includes the removable feature of female connector plugs 28, 40 introduced into each end of internal conduit 52 of wiper blade 20 and fastened thereto. As illustrated by the foregoing summary, female connector plugs 28, 40 may be removed from internal conduit 50 to provide for the convenient replacement of heating element 52 or wiper blade 20 with another complimentary unit.

From the above discussion, it will be readily appreciated that the present invention provides a heat conducting apparatus for wiper blades utilizing a commercially inexpensive heating element which does not require heavy insulation to buffer the heat output generated by the heating element into the body of the wiper blade. Unlike prior art heated wiper blades, the present invention provides a heat conducting apparatus for wiper blades which is capable of enhancing the flexibility of the wiper blade, while eliminating thermal abrasions and fatigue in the wiper blade caused by localized high heat outputs generated by the heating element.

Additionally, the present invention provides a heat conducting apparatus for wiper blades which is capable of maintaining a continuous temperature of between 26° and 38° C. (80°–100° F.) to effectively remove and prevent snow and ice accumulations on wiper blades. In addition, the present invention provides a heat conducting apparatus for wiper blades which is easily replaceable and adaptable to conventional wiper blades and wiper assembly arms.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by the United States Letters Patent is:

1. A heated wiper assembly adapted to be mounted on a wiper extension arm operably connected to a wiper motor for reciprocating said wiper extension arm across a windshield of a vehicle, said heated wiper assembly comprising:

an elongated wiping means for clearing the windshield, said wiping means having first and second ends, said wiping means being formed of a resilient material and having a selectively sealable internal cavity longitudinally extending therethrough with openings at said first and second ends, said internal cavity having a substantially uniform configuration;

mounting means receiving said wiping means for supporting said wiping means along a length thereof;

retaining means adapted to be coupled to the wiper extension arm, said retaining means receiving the mounting means and retaining the wiping means in conformation with an exterior contour of the windshield;

an elongated heating means operably connected to an electrical power source for heating the wiping means, said heating means having first and second ends and being inserted into the internal cavity formed within said wiping means, said heating means suspended therein at its first and second ends by sealing means, said heating means being suspended between the first and second ends of the wiping means such that direct contact with the wiping means is prevented; and said sealing means sealing said openings of said internal cavity to provide a closed heating space within said wiping means from which heat generated by said heating means is restricted from escaping.

2. A heated wiper assembly as defined in claim 1 wherein said wiping means being adapted to be held in a curved form by the retaining means.

3. A heated wiper assembly as defined in claim 1 wherein said mounting means comprises a longitudinally-oriented channel, said channel providing an engaging means for removably connecting the wiping means to the mounting means.

4. A heated wiper assembly as defined in claim 1 wherein said wiping means comprises a main body, a mounting segment and a wiping edge, each of which substantially extends the length of the wiping means.

5. A heated wiper assembly as defined in claim 4 wherein said mounting segment is formed in a substantially T-shape configuration 6. A heated wiper assembly as defined in claim 4 wherein said wiping edge projects substantially outward from the main body in tapering fashion.

7. A heated wiper assembly as defined in claim 1 wherein said internal cavity is configured in a substantially cylindrical shape.

8. A heated wiper assembly as defined in claim 1 wherein said means for retaining the wiping means comprises a plurality of retaining members for receiving the mounting means.

9. A heated wiper assembly as defined in claim 1 wherein said retaining means is formed of stainless steel.

10. A heated wiper assembly as defined in claim 1 wherein said heating means comprises between approximately 30–32 gauge copper wire.

11. A heated wiper assembly as defined in claim 10 wherein said copper wire is rotatably wound into a plurality of tightly formed coils.

12. A heated wiper assembly as defined in claim 11 wherein said coils are formed having an inside diameter of approximately 0.15 cm.

13. A heated wiper assembly as defined in claim 11 wherein said cylindrical coils provide an electrical resistance to heating means of approximately 6.5+/−1 ohms at approximately 1 amp +/−0.5 amp at approximately 12 volts.

14. A heated wiper assembly as defined in claim 1 wherein said heating means generates a continuous heat output temperature between approximately 26° C. and 38° C.

15. A heated wiper assembly as defined in claim 1 wherein said heating means is coated with a protective finish for insulation.

16. A heated wiper assembly adapted to be mounted on a wiper extension arm operably connected to a wiper motor for reciprocating said wiper extension arm across a windshield of a vehicle, said heated wiper assembly comprising:

an elongated wiper blade for wiping the windshield, said wiper blade having first and second ends, said wiper blade being formed of a resilient material and having a selectively sealable internal cavity longitudinally extending therethrough with openings at said first and second ends, said internal cavity having a substantially uniform configuration;

mounting means removably receiving the wiper blade for supporting said wiper blade along a length thereof, said mounting means having a channel extending from a first end to a second end thereof;

a wiper arm assembly adapted to be coupled to the wiper extension arm, said wiper arm assembly comprising a plurality of retaining members for receiving said mounting means and retaining the wiper blade in conformation with an exterior contour of the windshield;

an elongated heating element adapted to be operably connected to an electrical power source for heating the wiper blade at a continuous heat output temperature between approximately 26° C. and 38° C., said heating element having first and second ends and being removably inserted into the internal cavity formed within said wiper blade, said heating element suspended therein at its first and second ends by sealing means, said heating element being suspended between the first and second ends of the wiper blade such that direct contact with the wiper blade is prevented; and said sealing means sealing said openings of said internal cavity to provide a closed heating space within said wiper blade from which heat generated by said heating element is restricted from escaping.

17. A heated wiper assembly as defined in claim 16 wherein said wiper blade comprises a main body, a mounting segment formed in a substantially T-shape configuration, and a wiping edge which projects substantially outward from said main body in a tapering fashion.

18. A heated wiper assembly as defined in claim 16 wherein said heating element comprises an approximately 30–32 gauge copper wire rotatably wound into a plurality of tightly formed coils having an inside diameter of approximately 0.15 cm to provide an electrical resistance of approximately, 6.5+/−1 Ohms at approximately 1 amp +/−0.5 amp at approximately 12 volts.

19. A heated wiper assembly as defined in claim 16 wherein said heating element is coated with a protective finish for insulation.

* * * * *